J. IVES.

Top-Prop for Carriages.

No. 8,857. Reissued Aug. 19, 1879.

Witnesses

Chandler Haw

Thomas E. Birch.

Inventor.

James Ives by his Attorney

Edwin H. Brown

UNITED STATES PATENT OFFICE.

JAMES IVES, OF MOUNT CARMEL, CONNECTICUT.

IMPROVEMENT IN TOP-PROPS FOR CARRIAGES.

Specification forming part of Letters Patent No. 186,039, dated January 9, 1877; Reissue No. 8,857, dated August 19, 1879; application filed January 9, 1879.

*To all whom it may concern:*

Be it known that I, JAMES IVES, of Mount Carmel, in the county of New Haven and State of Connecticut, have invented a new and useful Improvement in Carriage-Top Props; and I do hereby declare that the following is a full, clear, and exact description thereof, reference being had to the accompanying drawings, making part of this specification, in which—

Figure 1:
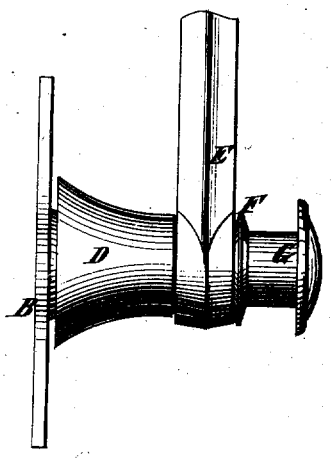
Figure 2:
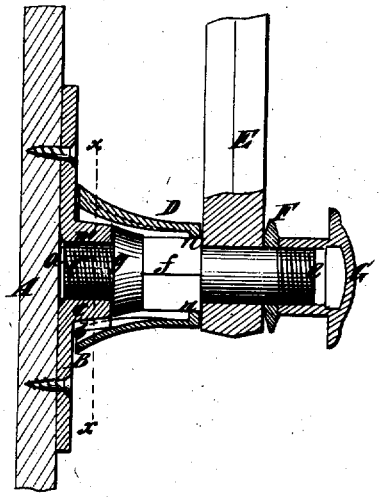
Figure 3:
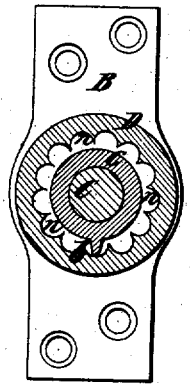
Figure 4:
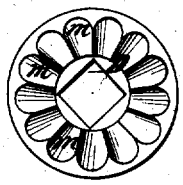

Figure 1 is a front elevation of my improved carriage-top prop. Fig. 2 is a vertical longitudinal section of the same. Fig. 3 is a vertical cross-section of the same in the line *x x* of Fig. 2; and Fig. 4 is a bottom face view of the covering-washer.

The object of my invention is, first, to prevent the screw-bolt of a carriage-top prop from accidentally unscrewing after once it is inserted to its place, and yet to permit the screw-bolt to be screwed into the socket plate to a greater or less degree, as may be desirable; second, to prevent the joint end from loosening the prop-nut in the ordinary raising and lowering of the carriage-top, which is a very common evil, and often results in the loss of the nut.

My invention consists in the combination, with a screw-socket and a screw-bolt, of a covering-washer locked to said screw-socket and screw-bolt, and an interlocking rib and a series of notches, whereby the said covering-washer is locked to one of said parts, thus affording facility for securing it in a variety of positions, and affording the screw-bolt provision for slight adjustment.

It also consists in various parts and combinations of parts, hereinafter described and claimed.

In the accompanying drawings, A is a standard or bow of a carriage-top. B is a metal socket-plate, which is, in this example of my invention, shown as hollowed out on its under side, as at *a*, so as to be at relief at its center when it is secured, for instance, by screws to the standard or bow A. This socket-plate has a rib, catch, or stop, *b*, projecting out from the circumference of the socket-collar *c*.

C is a screw-bolt, made with a screw-thread, *e*, on its outer end for the attachment of the binding-nut G. This bolt also has a polygonal portion formed on it at *f* and a shoulder at *g*, and between the polygonal portion *f* and its screw-threaded portion *e* it is shown as cylindrical and smooth, to receive and admit of the play of the joint end or arm E and double-convex lenticular washer F.

The bolt C screws into the socket-collar *c* of the socket-plate, and its shoulder *g* is intended to abut against the end of the said socket-collar.

D is a covering or skirting washer (shown as bell-shaped) placed over the screw-bolt and socket-collar *c* of the socket-plate B. In the base or inner end of this washer is a series of catches, *m*, consisting of notches or ribs, made, in this instance, in the form of adjacent scallops. At the outer end of this washer is a polygonal opening. (Shown as formed in an inwardly-extending flange, *n*, and fitting the polygonal portion *f* of the screw-bolt.)

The covering-washer, constructed as described, engages, by means of any one of its catches *m*, over the catch or stop *b*, and, by means of the polygonal opening at its outer end, engages with the polygonal part *f* of the bolt C; and thus arranged it (the washer) prevents the bolt turning, and, in turn, is prevented from turning itself, the stop *b* effecting the latter result, and the polygonal part of the bolt the former result.

The prop or binding-nut G is screwed on the end of the bolt until all the parts are forced snugly against one another, as shown.

The washer, it will be observed from the drawings, only impinges upon the joint end and nut near its eye or bore, and therefore friction outside of this point is avoided and the danger of loosening the nut lessened.

In case it is desired to tighten up the parts of the prop, on account of wear or rattling, the nut G is turned back and the washer D moved, so as to be disengaged from the catch or stop *b*, and then the bolt C is screwed farther into the socket-plate and the parts again fastened by the binding or joint nut G.

By having the catches *m* in the base or inner end of the covering-washer D, adjacent to each other, very slight adjustment of the bolt may be made, and no difficulty will be experienced in getting the parts into their proper positions. This is difficult, if not impossible, with other top-props, unless the bolt be entirely removed from the socket and a portion of its shoulder *g* turned down, so as to permit the screw to be turned in its socket a quarter of a circle; and by having the washer flaring or bell-shaped, and with a polygonal opening, the washer can be made very tight and at less expense than heretofore, and still it will answer to fit firmly upon the polygonal part of the screw-bolt.

In carrying out my invention the scallops or notches *m* might be formed on one of the other parts, and the catch or stop *b* on the washer D; but I prefer the plan represented and described.

What I claim as new, and desire to secure by Letters Patent, is—

1. The combination, with a screw-socket and a screw-bolt, of a covering-washer locked to said screw-socket and screw-bolt, and an interlocking rib and a series of notches, where by the said covering-washer is locked to one of said parts.

2. A covering-washer for use with the screw-socket and screw-bolt of a carriage-top prop, provided internally with ribs for locking it in place.

3. The combination, with the covering-washer constructed with the inwardly-extending flange at one end and ribs at the other, of the screw-bolt, the socket-plate, and catch or stop, substantially as described.

4. The double-convex metal washer, in combination with the joint end, binding-nut, and prop-bolt, as described.

JAMES IVES.

Witnesses:
JAMES H. WEBB,
M. A. IVES.